Patented Nov. 28, 1944

2,363,906

UNITED STATES PATENT OFFICE 2,363,906

AZO PIGMENTS OF THE PHTHALOCYANINE SERIES

Swanie Siguard Rossander, Wilmington, Del., James William Libby, Jr., Louisville, Ky., and Harold Edward Woodward, Penns Grove, N. J., assignors to E. I. du Pont de Nemours & Company, Wilmington, Del., a corporation of Delaware No Drawing. Application January 8, 1943, Serial No. 471,732

15 Claims. (Cl. 8—42)

This invention relates to azo-pigments of the phthalocyanine series. More particularly, this invention is concerned with the preparation of novel phthalocyanine-azo compounds, both in substance and on the fiber.

It is an object of this invention to provide new colors of the azo-phthalocyanine class, characterized by valuable shades and good fastness qualities. Another object of this invention is to provide methods of preparation of these pigments both in substance and on the fiber. Still another object is to provide a method for producing dyeings on cellulose fibers which are fast to both light and washing. Other and further important objects of this invention will appear as the description proceeds.

In copending application of N. H. Haddock, Serial No. 451,076 (Patent No. 2,351,119, issued June 13, 1944), water-insoluble azo pigments of the phthalocyanine series are described, which are formed by azotizing various amino-phthalocyanines and coupling, in substance, to azo coupling components devoid of water-solubilizing groups. In copending application of H. Blackshaw and N. H. Haddock, Serial No. 444,107 (Patent No. 2,339,740, issued January 18, 1944), coloring matters of the same class are produced on the fiber, by impregnating cellulosic fiber with a solution of an azotized amino-phthalocyanine, followed by coupling on the fiber, that is, developing with an azo coupling component devoid of water-soluble groups.

In both of the above cases, coupling components having water-solubilizing groups, such as carboxy and sulfo, appear to have been carefully avoided by the inventors, presumably for fear that the resulting dyeings on the fiber might not be fast to washing.

Now, we have found that if azo-phthalocyanine compounds are formed in substance or on the fiber, following in general the procedures set forth in the above applications but using as coupling components an aromatic compound having an ortho-hydroxy-carboxy grouping, water-insoluble pigments or wash-fast dyeings, respectively, are obtained; and that the azo-phthalocyanine compounds thus obtained may be further improved as to light-fastness by metallization, that is, by treatment with baths containing soluble compounds of metals of the group which are capable of forming metallic complexes with ortho-hydroxy azo dyes in general.

Any of the amino-phthalocyanines mentioned in copending application Serial No. 444,107 (Patent No. 2,339,740) may be used as the diazo component in the preparation of pigments or dyeings according to this invention. For example, the (3)- and (4)-di-, tri- and tetra-amino derivatives of metal-free phthalocyanine may be used, or the corresponding di-, tri- or tetra-amino derivatives of copper-phthalocyanine, cobalt-phthalocyanine and nickel-phthalocyanine. The coupling components suitable for this invention are those which contain a hydroxy group in position adjacent to a carboxy group and which also possess the ability to couple with diazonium compounds. As practical examples of satisfactory coupling components may be mentioned salicylic acid, p-cresotinic acid, 2-hydroxy-3-naphthoic acid, 2-hydroxy-carbazole-3-carboxylic acid, and the nuclear substitution products of the above-mentioned compounds wherein the coupling position is not substituted.

A preferred embodiment of the invention involves the use of sufficient nitrite to azotize all of the available amino groups of the polyamino-phthalocyanine employed; but satisfactory dyeings with, for example, tetra-amino-phthalocyanine, may be obtained by using less than four moles of nitrous acid for every mole of tetra-amino-phthalocyanine involved. For example, a satisfactory dyeing suitable for metallization may be obtained by azotizing tetra-amino-phthalocyanine with sufficient nitrite to azotize only three of the amino groups, impregnating the fiber with said azotized amino-phthalocyanine and coupling it thereon with, for example, 2-hydroxy-3-naphthoic acid. In this connection, it should be borne in mind that the polydiazonium phthalocyanines are not particularly stable, and even where sufficient nitrite is used to azotize all of the amino groups, decomposition of some of the diazo groups may take place prior to complete coupling; thus, in the case of tetra-amino-copper-phthalocyanine, for instance, the actual dyeing on the fiber may under circumstances be a mixture of the tetrakisazo, trisazo, disazo and even monoazo derivatives of the phthalocyanine compound.

When our invention is applied to the development of color on the fiber, both dyeing and printing procedures may be employed. More particularly, any one of the following methods may be used:

1. The fiber may be impregnated with a solution of the azotized polyamino-phthalocyanine and then treated with an alkaline solution of an appropriate coupling component from the group above defined.

2. The fiber may be printed with a solution of the azotized polyamino-phthalocyanine which has been thickened with an ordinary printing paste thickener, such as gum tragacanth; and said printing may then be aftertreated in an aqueous alkaline bath containing dissolved therein a suitable coupling component of the group above defined.

Instead of using freshly prepared solutions of azotized amino-phthalocyanine for the purpose of impregnating cellulose fiber, there may be employed solutions prepared by dissolving in water phthalocyanine diazonium compounds which have been stabilized in dry form by conversion to the inorganic double salts, isodiazotates, etc. See, for instance, copending application of N. H. Haddock, Serial No. 443,668 (Pat. No. 2,349,090, issued May 16, 1944).

The metallizing agents suitable for use in connection with the present invention include water-soluble compounds of metals capable of forming complex compounds; for instance, the water-soluble salts of copper, cobalt, nickel and chromium, or more generally, metals of atomic weight between 51 and 64. As practical examples of such water-soluble salts may be mentioned copper acetate, copper sulfate, cuprammonium sulfate, cupric chloride, nickel acetate, cobalt acetate, cobalt chloride, chromium acetate and chromium fluoride.

The dyeings are aftertreated in aqueous baths containing one or more of the said metallic agents, for from about 10 to 60 minutes at temperatures which may range from about room temperature to about the boiling point of the bath. The volume of the aftertreating bath is not particularly critical, but sufficient volume should be employed so that the dyeing is completely covered for essentially the major portion of the aftertreating period. The amount of the metallizing agent used may be varied within reasonable limits, but there is normally employed a weight equivalent to from about 1% to about 10% of the weight of the fabric being aftertreated. The pH of the bath should not be below that obtainable by merely dissolving the metallic salt in substantially neutral water.

The following examples are given to illustrate the invention, but without intent to limit it in any way. Parts are by weight of 100% material, except where otherwise specified.

Example I

To 2.75 parts of a 9% aqueous slurry of copper tetra-(4)-amino-phthalocyanine were added 6.3 parts of 10-normal hydrochloric acid and sufficient ice to reduce the temperature to approximately 5° C. Then 1 part of 2-normal sodium nitrite solution was added, and the resulting solution was stirred for one hour at 0° to 5° C. At the end of that time, the solution was filtered and diluted to 175 parts with water. Five grams of cotton piece-goods were stirred in this solution at 0° to 5° C. for one hour. The piece was then removed, rinsed in cold water and treated in a bath consisting of 250 parts of water, 0.2 part of 2-hydroxy-3-naphthoic acid, 1 part of 2-normal sodium hydroxide solution and 1 part of 2-normal sodium carbonate solution for 15 minutes. This dyeing was aftertreated at 90° C. for 20 minutes in a bath consisting of 100 parts water and 0.13 part copper acetate. The dyeing obtained was a gray shade with very good washing fastness and excellent light fastness.

Example II

Five parts of cotton piece-goods were impregnated with azotized copper tetra-(4)-amino-phthalocyanine as described in Example I. The cloth was removed from the dyebath, rinsed in cold water and treated in a bath consisting of 250 parts of water, 0.2 part of salicylic acid, and 4 parts of 2-normal sodium carbonate solution for 15 minutes. The dyeing was then aftertreated at 88° C. for 20 minutes in a bath consisting of 100 parts of water and 0.13 part of copper acetate. The dyeing obtained was a dull green shade with excellent washing fastness and light fastness.

Example III

In an ice bath, 16 parts of tetra-(4)-amino-copper-phthalocyanine were slurried for an hour. Then 100 parts of ice and 200 parts of 10-normal hydrochloric acid were added, followed by 52 parts of 2-normal sodium nitrite. After stirring for about 20 minutes at 0° to 5° C., the solution was filtered and run into a cold solution of 15 parts of salicylic acid in 200 parts of water containing 4.2 parts of sodium hydroxide and 10.6 parts of sodium carbonate. A solution containing 75 parts of sodium hydroxide was added simultaneously at a rate which kept the coupling reaction alkaline to Brilliant Yellow paper at all times, and ice was added to keep the temperature below 10° C. during the coupling.

When the coupling was complete, the insoluble green color was filtered and washed. It was then slurried with 200 parts of water, and after adding 110 parts of a molar solution of copper sulfate and 80 parts of ammonium hydroxide solution, it was heated at 90° C. for 3 hours. The dark green pigment was filtered and washed. A portion of this pigment was milled in lithographic varnish and it gave a black ink of dark green undertone and slate green tint. The light fastness of the ink was excellent. Another portion of this pigment was incorporated in a water-in-lacquer emulsion in which the lacquer phase contained a pigment binding agent, and the mixture was printed on cotton cloth and baked at 150° C. for 5 minutes. The print obtained was a dull green which showed excellent fastness to light on being exposed in a Fade-Ometer for 200 hours.

Example IV

When 20 parts of 2-hydroxy-3-naphthoic acid were used in place of 15 parts of salicyclic acid in Example III, a pigment was obtained which gave an ink of black masstone and undertone and blue gray tint. The fastness to light was excellent. The textile print of this pigment was gray, and it had very good light fastness on long exposure in the Fade-Ometer.

Example V

When an equivalent amount of nickel chloride was used in place of the copper sulfate in Example IV, a similar pigment was obtained which was equally good in fastness to light on long exposure.

In the following table are summarized the shades obtained by preparing dyeings with the amino-phthalocyanines indicated, with the coupling components indicated, and with the specified aftertreating metallic agent. The dyeings were prepared in a manner exactly analogous to those described in Examples I and II.

| Ex. | Azotized tetra-amino-copper-phthalocyanine coupled on the fiber with— | Then treated with— | Shade |
|---|---|---|---|
| VI | Salicylic acid | Nickel acetate | Dull green. |
|  | do | Cobalt acetate | Do. |
|  | do | Chromium acetate | Do. |
| VII | 2,3-hydroxy-naphthoic acid | Copper acetate | Gray. |
|  | do | Nickel acetate | Dull gray. |
|  | do | Cobalt acetate | Do. |
|  | do | Chromium acetate | Do. |

| Ex. | Azotized tri-amino-copper-phthalocyanine coupled on the fiber with— | Then treated with— | Shade |
|---|---|---|---|
| VIII | Salicylic acid | Copper acetate | Dull green. |
|  | do | Nickel acetate | Do. |
|  | do | Cobalt acetate | Do. |
|  | do | Chromium acetate | Do. |

| Ex. | Azotized di-amino-copper-phthalocyanine coupled on the fiber with— | Then treated with— | Shade |
|---|---|---|---|
| IX | Salicylic acid | Copper acetate | Blue. |
|  | do | Nickel acetate | Do. |
|  | do | Cobalt acetate | Do. |
|  | do | Chromium acetate | Do. |

| Ex. | Azotized tri-amino-copper-phthalocyanine coupled on the fiber with— | Then treated with— | Shade |
|---|---|---|---|
| X | 2,3-hydroxy-naphthoic acid | Copper acetate | Gray. |
|  | do | Nickel acetate | Do. |
|  | do | Cobalt acetate | Do. |
|  | do | Chromium acetate | Do. |

| Ex. | Azotized di-amino-copper-phthalocyanine coupled on the fiber with— | Then treated with— | Shade |
|---|---|---|---|
| XI | 2,3-hydroxy-naphthoic acid | Copper acetate | Dull blue. |
|  | do | Nickel acetate | Do. |
|  | do | Cobalt acetate | Do. |
|  | do | Chromium acetate | Do. |

| Ex. | Azotized tetra-amino-copper-phthalocyanine coupled on the fiber with— | Then treated with— | Shade |
|---|---|---|---|
| XII | p-Cresotinic acid | Copper acetate | Dull green. |
|  | do | Nickel acetate | Do. |
|  | do | Cobalt acetate | Do. |
|  | do | Chromium acetate | Do. |
| XIII | 2-hydroxy-5-chloro-benzoic acid | Copper acetate | Do. |
|  | do | Nickel acetate | Do. |
|  | do | Cobalt acetate | Do. |
|  | do | Chromium acetate | Do. |

It will be understood that the above examples are merely illustrative, and that many variations in details may be practiced therein without departing from the spirit of this invention.

Although for best qualities as to light-fastness we prefer to subject the intermediate phthalocyanine-azo dyeings and pigments to metallization as above described, the said phthalocyanine-azo pigments and dyeings themselves possess a surprising degree of wash fastness and other good qualities, and may, if desired, be employed without subsequent metallization. This is illustrated by the following additional examples:

*Example XIV*

The procedure is the same as in Example I, except that the after-treatment with copper acetate is omitted. A chocolate brown shade of good wash fastness is obtained.

*Example XV*

The procedure is the same as in Example I, except that the after-treatment step is omitted and the development bath is replaced by one consisting of 250 parts of water, 0.2 part of salicylic acid and 4 parts of 2-normal sodium carbonate solution. A blue green dyeing is obtained which has very good washing fastness and excellent light-fastness.

*Example XVI*

To 3 parts of an 8.6% water slurry of tri-(4)-amino-copper-phthalocyanine there are added 4.7 parts of 2-normal hydrochloric acid, sufficient ice to reduce the temperature to 5° C., and 1 part of 2-normal sodium nitrite solution. 150 parts of water at 0° C. are added, and the mixture is stirred for 30 minutes. This solution is then diluted to 175 parts with cold water. 5 parts of cotton cloth are stirred in this solution for 60 minutes, then removed and rinsed in cold water. The dyeing is developed by immersing for 15 minutes at 0° C. in a bath consisting of 248 parts ice water, 0.25 salicylic acid and 2 parts of 2-normal sodium carbonate solution. The green dyeing obtained has excellent washing fastness and excellent lightfastness.

*Example XVII*

The salicylic acid in Example XVI is replaced by 2,3-hydroxy-naphthoic acid. A dull purple shade is obtained.

*Example VXIII*

Copper-tetra-(4)-amino-phthalocyanine is azotized as in Example 1, and, while holding the temperature at 0° C., the acidity is adjusted by the addition of sodium acetate until it reaches a pH value of approximately 3. This solution is then thickened to a printing paste by the addition of a thickener, as for example gum tragacanth. Cloth is pre-padded with a solution containing 2 parts of salicylic acid per 100 parts of water and sufficient sodium carbonate to maintain distinct Brilliant Yellow alkalinity. The fabric is squeezed until it retains its own weight of the solution and then dried. It is then printed with the above paste, dried, rinsed and dried. The print is green in shade and displays excellent washing and lightfastness.

We claim:

1. Azo coloring compounds of the general formula $(MPc)-(N=N-Q)_x$, wherein (MPc) designates the radical of a phthalocyanine compound selected from the group consisting of metal-free phthalocyanines and metal-phthalocyanines, Q is the radical of an aromatic compound having an ortho-hydroxy-carboxy grouping, while $x$ is a number not greater than 4.

2. Textile fiber being colored with an azo coloring compound as defined in claim 1.

3. The metal complex forms of azo pigments of the phthalocyanine series, the metal being one of atomic weight between 51 and 64 and being present in addition to any metal atoms which may be present as part of the phthalocyanine nucleus, and the components linked through azo bridges to the phthalocyanine nucleus being aromatic compounds having a hydroxy group and a carboxy group in adjacent positions.

4. Textile fiber being colored with a metal complex form of an azo pigment of the phthalocyanine series as defined in claim 3.

5. A metal complex form of an azo coloring compound of the formula (MPc)—(N=N—Q)$_x$, wherein (MPc) designates the radical of a phthalocyanine compound selected from the group consisting of metal-free phthalocyanines and metal-phthalocyanines, Q is the radical of an aromatic compound having an ortho-hydroxy-carboxy grouping, while $x$ is a number not greater than 4, the metal in said metal complex form being a member of the group consisting of copper, nickel, cobalt and chromium, and being present in addition to any metal which may be present as part of the (MPc) group above defined.

6. A metal complex form of an azo coloring compound of the formula CuPc—(N=N—Q)$_x$, wherein CuPc designates the radical of copper phthalocyanine, Q is the radical of an aromatic compound having an ortho-hydroxy-carboxy grouping, while $x$ is a number not greater than 4, the metal in said metallized form being a member of the group consisting of copper, nickel, cobalt and chromium and being present in addition to the copper atom in the CuPc radical above defined.

7. Cellulosic textile fiber having developed on the fiber a metal complex form of a copper-phthalocyanine azo compound as defined in claim 6.

8. The process of producing novel coloring matters of the phthalocyanine series, which comprises coupling an azotized form of a polyamino-phthalocyanine compound to an aromatic compound having an ortho-hydroxy-carboxy grouping and at least one free couplable position.

9. The process of coloring textile fiber, which comprises impregnating the fiber with an azotized polyamino-phthalocyanine compound and then developing the dye on the fiber by coupling to an aromatic compound having an ortho-hydroxy-carboxy grouping and at least one free couplable position.

10. The process of producing novel coloring matters of the phthalocyanine series, which comprises reacting with a water-soluble compound of a metal whose atomic weight is between 51 and 64 upon an azo compound of the phthalocyanine series produced by coupling an azotized polyamino-phthalocyanine to an aromatic compound having an ortho-hydroxy-carboxy grouping and at least one free couplable position.

11. The process of coloring textile fiber, which comprises developing on the fiber an azo dye by coupling on the fiber an azotized polyamino-phthalocyanine to an aromatic compound having an ortho-hydroxy-carboxy grouping and at least one free couplable position, and then treating the dyed fabric with a water-soluble compound of a metal whose atomic weight is between 51 and 64, to metallize the azo dye on the fiber.

12. The copper complex of a phthalocyanine azo dye obtained by coupling an azotized tetra-amino-copper-phthalocyanine to a member of the group consisting of salicylic acid, cresotinic acid, 2-hydroxy-5-chloro-benzoic acid and 2,3-hydroxy-naphthoic acid.

13. The nickel complex of a phthalocyanine azo dye obtained by coupling an azotized tetra-amino-copper-phthalocyanine to a member of the group consisting of salicylic acid, cresotinic acid, 2-hydroxy-5-chloro-benzoic acid and 2,3-hydroxy-naphthoic acid.

14. Textile material colored with the copper complex of a phthalocyanine azo dye as defined in claim 12.

15. Textile material colored with the nickel complex of a phthalocyanine azo dye as defined in claim 13.

SWANIE SIGUARD ROSSANDER.
JAMES WILLIAM LIBBY, Jr.
HAROLD EDWARD WOODWARD.